United States Patent
Hao et al.

(10) Patent No.: US 9,989,792 B2
(45) Date of Patent: Jun. 5, 2018

(54) DISPLAY DEVICE AND ASSEMBLING METHOD THEREOF

(71) Applicants: BOE TECHNOLOGY GROUP CO., LTD., Beijing (CN); BOE OPTICAL SCIENCE AND TECHNOLOGY CO., LTD., Suzhou (CN)

(72) Inventors: Ji Hao, Beijing (CN); Yan Hou, Beijing (CN); Zhongcheng Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 70 days.

(21) Appl. No.: 14/567,307

(22) Filed: Dec. 11, 2014

(65) Prior Publication Data

US 2016/0054612 A1 Feb. 25, 2016

(30) Foreign Application Priority Data

Aug. 19, 2014 (CN) .......................... 2014 1 0409296

(51) Int. Cl.
G02F 1/1333 (2006.01)

(52) U.S. Cl.
CPC ............... *G02F 1/133308* (2013.01); *G02F 2001/133331* (2013.01); *G02F 2202/28* (2013.01)

(58) Field of Classification Search
None
See application file for complete search history.

(56) References Cited

U.S. PATENT DOCUMENTS

2009/0185101 A1* 7/2009 Matsuhira ............. G02F 1/1339
349/58
2009/0322999 A1 12/2009 Sano et al.
2010/0245707 A1 9/2010 Harada
(Continued)

FOREIGN PATENT DOCUMENTS

CN 101846834 a 9/2010
CN 102768420 A 11/2012

OTHER PUBLICATIONS

First Chinese Office Action dated Jun. 27, 2016; Appln. No. 201410409296.2.
(Continued)

*Primary Examiner* — Edward Glick
*Assistant Examiner* — Shan Liu
(74) *Attorney, Agent, or Firm* — Ladas & Parry LLP

(57) ABSTRACT

Embodiments of the disclosure provide a display device and an assembling method thereof. The display device comprises a frame and a display module provided inside the frame, and the display module comprises a liquid crystal panel and a transparent cover plate. A transparent bonding adhesive is fully filled between a light exit surface of the liquid crystal panel and a surface of the transparent cover plate facing the liquid crystal panel and bonds the light exit surface of the liquid crystal panel with the surface of the transparent cover plate facing the liquid crystal panel. A support mechanism is disposed on an inner surface of the frame, and the support mechanism is bonded with the liquid crystal panel and/or the transparent cover plate.

12 Claims, 1 Drawing Sheet

(56) References Cited

U.S. PATENT DOCUMENTS

| | | | |
|---|---|---|---|
| 2011/0037726 A1* | 2/2011 | Lee | G06F 3/0414 345/174 |
| 2012/0020000 A1* | 1/2012 | Mathew | G06F 1/1637 361/679.26 |
| 2012/0162565 A1* | 6/2012 | Lee, II | G02F 1/133308 349/58 |
| 2012/0281383 A1* | 11/2012 | Hwang | G02F 1/133308 361/807 |
| 2012/0287368 A1* | 11/2012 | Que | G02B 6/0086 349/58 |
| 2012/0300153 A1* | 11/2012 | Fujii | G02F 1/133615 349/58 |
| 2013/0027857 A1* | 1/2013 | Jeong | G02F 1/133308 361/679.01 |
| 2013/0250498 A1* | 9/2013 | Shon | H05K 5/0017 361/679.01 |
| 2013/0271896 A1* | 10/2013 | Hu | G02F 1/133308 361/679.01 |
| 2014/0098035 A1* | 4/2014 | Huang | G06F 3/041 345/173 |
| 2014/0184926 A1* | 7/2014 | Shimomichi | H04N 5/645 348/794 |
| 2015/0002757 A1* | 1/2015 | Baek | G02F 1/133308 349/12 |
| 2015/0022753 A1* | 1/2015 | Akatsuka | G02F 1/133308 349/58 |
| 2015/0116607 A1* | 4/2015 | Cheng | H05K 5/02 349/12 |
| 2015/0153612 A1* | 6/2015 | Hirabayashi | G02F 1/133385 349/5 |
| 2015/0168767 A1* | 6/2015 | Yonemura | G02F 1/133308 349/58 |
| 2015/0366082 A1* | 12/2015 | Jang | G02F 1/133308 361/679.01 |
| 2016/0381317 A1* | 12/2016 | Hosoki | G02B 6/0083 349/65 |

OTHER PUBLICATIONS

Second Chinese Office Action dated Dec. 2, 2016; Appln. No. 20141040926.2.
The Third Chinese Office Action dated May 12, 2017; Appln. No. 201410409296.2.

* cited by examiner

DISPLAY DEVICE AND ASSEMBLING METHOD THEREOF

TECHNICAL FIELD

Embodiments of the disclosure relate to a display device and an assembling method thereof.

BACKGROUND

With rapid developments of Liquid Crystal Display Televisions (LCD TVs), people have become increasingly demanding for the LCD TVs. Early LCD TVs are very thick with a very wide frame, which look relatively less attractive; in order to solve this problem, manufacturers compete to design a variety of narrow-frame, ultra-narrow frame, or frameless ultra-thin LCD TVs, and particularly, the frameless LCD TVs have a very magnificent appearance.

The frameless structure may be realized by frame bonding technology, that is, bonding a periphery of a liquid crystal panel and a periphery of a glass plate together by a double-sided adhesive tape or other adhesives, assembling the bonded liquid crystal panel and glass plate with a backlight unit, to form the frameless LCD TV with the surface of the glass plate as the appearance surface of the LCD TV. However, in the frame bonding technology, merely the periphery of the liquid crystal panel and the periphery of the glass plate are bonded, so that an air layer is formed between an intermediate portion of the liquid crystal panel and an intermediate portion of the reinforced glass and double image will appear when the user views the screen.

SUMMARY

According to embodiments of the disclosure, there is provided a display device. The display device comprises a frame and a display module provided inside the frame, and the display module comprises a liquid crystal panel and a transparent cover plate. A transparent bonding adhesive is fully filled between a light exit surface of the liquid crystal panel and a surface of the transparent cover plate facing the liquid crystal panel and bonds the light exit surface of the liquid crystal panel with the surface of the transparent cover plate facing the liquid crystal panel. A support mechanism is disposed on an inner surface of the frame, and the support mechanism is bonded with the liquid crystal panel and/or the transparent cover plate.

For example, the transparent bonding adhesive is made of a jelly glue.

For example, the frame is made of aluminum, and the support mechanism is made of aluminum.

For example, the frame and the support mechanism are not integrally formed, and the support mechanism is fixed to the frame by a screw.

For example, the support mechanism is bonded with the liquid crystal panel and/or the transparent cover plate by a double-sided adhesive tape; or the support mechanism is bonded with the liquid crystal panel and/or the transparent cover plate by a silicone adhesive.

For example, the transparent cover plate is a reinforced glass cover plate or a transparent plastic cover plate.

For example, the display module further comprises a backlight unit; and the backlight unit comprises: a rear housing; and a light source, a reflective sheet, a light guide plate and optical films provided between the rear housing and the liquid crystal panel.

For example, the light source is attached to the support mechanism, and the light guide plate and the rear housing are fixed to the support mechanism.

For example, the rear housing of the backlight unit constitutes a shell of the display device.

For example, the display device further comprises a function module, and the function module is provided on an outside surface of the rear housing of the backlight unit.

According to embodiments of the disclosure, there is provided an assembling method of the above-described display device. The assembling method comprises steps of: fully filling the transparent bonding adhesive between the liquid crystal panel and the transparent cover plate so that the liquid crystal panel and the transparent cover plate are completely bonded with each other; bonding the liquid crystal panel and the transparent cover plate that have been bonded with each other to the support mechanism disposed on the inner surface of the frame; and attaching the light source of the backlight unit to the support mechanism, sequentially stacking optical films, the light guide plate and the reflective sheet of the backlight unit along a direction from the light exit surface to a light entrance surface of the liquid crystal panel, and fixing the rear housing of the backlight unit to the support mechanism.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
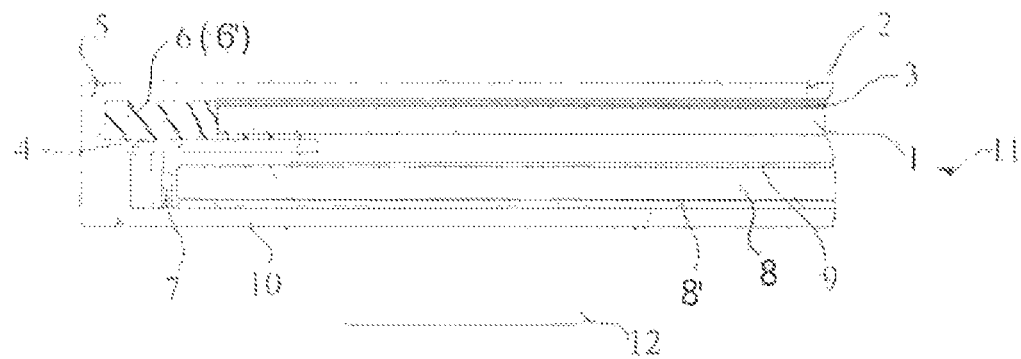
FIG. 1 is a structural schematic diagram illustrating a display device according to embodiments of the disclosure.
Figure 2:
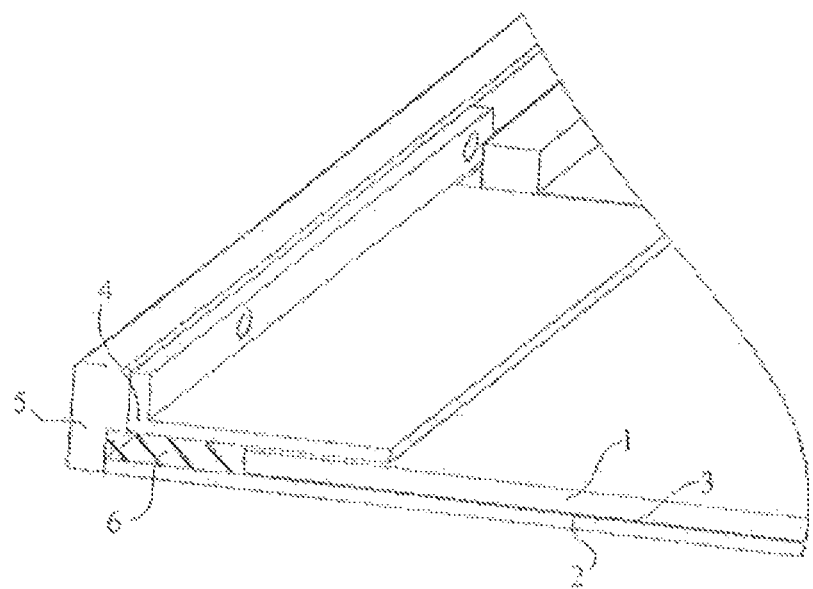
FIG. 2 is a schematic diagram illustrating the display device according to the embodiments of the disclosure in which a support mechanism is fixed to a frame by a screw.

FIG. 1 is a structural schematic diagram illustrating a display device according to embodiments of the disclosure; FIG. 2 is a schematic diagram illustrating the display device according to the embodiments of the disclosure in which a support mechanism is fixed to a frame by a screw.

As shown in FIG. 1 and FIG. 2, the display device according to the embodiments of the disclosure comprises a frame 5 and a display module 11 provided inside the frame 5, the display module 11 comprises a liquid crystal panel 1 and a transparent cover plate 2. A transparent bonding adhesive 3 is fully filled between a light exit surface of the liquid crystal panel 1 and a surface of the transparent cover plate 2 facing the liquid crystal panel 1, and bonds the light exit surface of the liquid crystal panel 1 with the surface of the transparent cover plate 2 facing the liquid crystal panel 1.

A support mechanism 4 is disposed on an inner surface of the frame 5, and the support mechanism 4 is bonded with the liquid crystal panel 1 and/or the transparent cover plate 2 to support the liquid crystal panel 1 and the transparent cover plate 2.

In the above-described display device, the transparent cover plate 2 of the display module 11 is provided inside the frame 5 and the surface of the transparent cover plate 2 is an appearance surface of the display device, so the display device is a frameless display device. In the above-described display device, the light exit surface of the liquid crystal panel 1 of the display module 11 is completely bonded with the surface of the transparent cover plate 2 facing the liquid crystal panel 1, so that there is no air layer between the liquid crystal panel 1 and the transparent cover plate 2, double image will not appear in a display screen of the display device, and image is of a good quality.

For example, the transparent bonding adhesive 3 is made of a jelly glue.

For example, the frame 5 is made of aluminum, and the support mechanism 4 is made of aluminum as well.

Since aluminum has a good thermal conductivity, the frame 5 and the support mechanism 4 made of aluminum enable a rapid heat dispersion of the liquid crystal panel 1, so that the display module 11 has a good heat dispersion property.

For example, the frame 5 and the support mechanism 4 are not integrally formed. Further, for example, the support mechanism 4 is fixed to the frame 5 by a screw.

Since in the above-described display device, the support mechanism 4 is bonded with the liquid crystal panel 1 and/or the transparent cover plate 2 of the display module 11 and the support mechanism 4 and the frame 5 are not integrally formed and fixed with each other by the screw, the frame 5 can be easily separated from the support mechanism 4 by loosing the screw and is replaced when the frame 5 functions poorly. Thus, when the support mechanism 4 and the frame 5 are not integrally formed, a rework cost can be reduced when certain component of the above-described display device functions poorly.

For example, the support mechanism 4 is bonded with the liquid crystal panel 1 and/or the transparent cover plate 2 with a bonding material 6 in modes of:

Mode 1: the support mechanism 4 is bonded with the liquid crystal panel 1 and/or the transparent cover plate 2 by a double-sided adhesive tape 6';

Mode 2: the support mechanism 4 is bonded with the liquid crystal panel 1 and/or the transparent cover plate 2 by a silicone adhesive 6'.

Of course, the support mechanism 4 may be bonded with the liquid crystal panel 1 and/or the transparent cover plate 2 by other bonding material substances 6 such as glue.

For example, the transparent cover plate 2 is a reinforced glass cover plate or a transparent plastic cover plate.

As shown in FIG. 1, the display module 11 further comprises a backlight unit. The backlight unit comprises a rear housing 10; and a light source 7, a reflective sheet 8', a light guide plate 8 and optical films 9 provided between the rear housing 10 and the liquid crystal panel 1.

For example, the rear housing 10 is made of aluminum, and the light source 7 is a bar of LEDs.

As shown in FIG. 1, the light source 7 is attached to the support mechanism 4, and the light guide plate 8 and the rear housing 10 are fixed to the support mechanism 4.

Since the light source 7 is attached to the support mechanism 4 and the support mechanism 4 is connected to the frame 5 and the rear housing 10, the support mechanism 4, the frame 5 and the rear housing 10 made of aluminum enable a rapid heat dispersion of the light source 7, so that the backlight unit has a good heat dispersion property.

For example, the rear housing 10 constitutes a shell of the display device.

The rear housing 10 of the backlight unit is used as the shell of the display device, so that a backplate of the display device in the prior art can be omitted and a better heat dispersion property can be achieved.

As shown in FIG. 1, the display device further comprises a function module 12, and the function module 12 is provided on an outside surface of the rear housing 10 of the backlight unit.

Since the function module 12 is provided on the outside surface of the rear housing 10, the display module 11 and the function module 12 can be separated so that the display module 11 can be made thinner. In addition, each of the display module 11 and the function module 12 has various configurations and the various configurations of the display module 11 and the various configurations of the function module 12 can be combined arbitrarily, so that the display device can be customized to meet the needs of the users.

The embodiments of the disclosure further provide an assembling method of a display device. For example, the assembling method comprises steps of:

Step S101: fully filling the transparent bonding adhesive 3 between the liquid crystal panel 1 and the transparent cover plate 2 so that the liquid crystal panel 1 and the transparent cover plate 2 are completely bonded with each other;

Step S102: bonding the liquid crystal panel 1 and the transparent cover plate 2 that have been bonded with each other to the support mechanism 4 disposed on the inner surface of the frame 5.

Step S103: attaching the light source 7 of the backlight unit to the support mechanism 4, sequentially stacking the optical films 9, the light guide plate 8 and the reflective sheet of the backlight unit along a direction from the light exit surface to a light entrance surface of the liquid crystal panel 1, and fixing the rear housing 10 of the backlight unit to the support mechanism 4.

In the display device obtained by the above-described assembling method, the liquid crystal panel 1 and the transparent cover plate 2 bonded with each other are provided inside the frame 5 and the surface of the transparent cover plate 2 is an appearance surface of the display device, so the display device is a frameless display device. In the above-described step S101, the light exit surface of the liquid crystal panel 1 of the display module 11 is completely bonded with the surface of the transparent cover plate 2 facing the liquid crystal panel 1, so that there is no air layer between the liquid crystal panel 1 and the transparent cover plate 2, double image will not appear in the display screen of the display device, and image is of a good quality.

The foregoing embodiments merely are exemplary embodiments of the disclosure, and not intended to define the scope of the invention, and the scope of the invention is determined by the appended claims.

The disclosure claims priority to and contains subject matters related to that disclosed in Chinese Priority Patent Application CN201410409296.2 filed on Aug. 19, 2014, the entire content of which is hereby incorporated by reference.

What is claimed is:

1. A display device, comprising:
   a frame;
   a display module, provided inside the frame, wherein the display module comprises a liquid crystal panel and a transparent cover plate, a topmost surface of the frame is coplanar with an outer surface of the transparent cover plate;
   a transparent bonding adhesive, fully filled between a light exit surface of the liquid crystal panel and a surface of the transparent cover plate facing the liquid crystal panel;
   a backlight unit, comprising a light source substrate;
   a support mechanism, disposed on an inner surface of the frame, wherein the support mechanism is in L-shaped and comprises a first part and a second part, the first part extends in a direction perpendicular to the liquid crystal panel, and the second part extends between the liquid crystal panel and the backlight unit in a direction parallel to the liquid crystal panel, the frame and the support mechanism are not integrally formed, a top surface of the second part and a second top surface of the frame are coplanar;
   a rear housing, comprising a bottom plate and a sidewall; and
   an adhesive, disposed in a space enclosed by the frame, the transparent cover plate, the supporting mechanism and the liquid crystal panel;
   wherein the adhesive within the space is in direct contact with the top surface of the second part, the second top surface and a side surface of the frame, a bottom surface of the transparent cover plate, and a bottom surface and a side surface of the liquid crystal panel; and
   wherein an outer surface of the sidewall of the rear housing is in contact with an inner surface of the first part of the supporting mechanism, and a top of the sidewall is against the second part of the supporting mechanism.

2. An assembling method of a display device according to claim 1, comprising steps of:
   fully filling the transparent bonding adhesive between the liquid crystal panel and the transparent cover plate so that the liquid crystal panel and the transparent cover plate are completely bonded with each other;
   bonding the liquid crystal panel and the transparent cover plate that have been bonded with each other to the support mechanism disposed on the inner surface of the frame; and
   attaching the light source substrate of the backlight unit to the support mechanism, sequentially stacking optical films, a light guide plate and a reflective sheet of the backlight unit along a direction from the light exit surface to a light entrance surface of the liquid crystal panel, and fixing the rear housing of the backlight unit to the support mechanism.

3. The display device according to claim 1, wherein the first part of the support mechanism is fixed to the frame by a screw.

4. The display device according to claim 1, wherein the adhesive is a double-sided adhesive tape or a silicone adhesive.

5. The display device according to claim 1, wherein the backlight unit comprises: a light source, a reflective sheet, a light guide plate and optical films provided between the rear housing and the liquid crystal panel.

6. The display device according to claim 5, wherein the second part is disposed between a bottom surface of the liquid crystal panel and the optical films.

7. The display device according to claim 5 wherein the light guide plate and the rear housing are fixed to the support mechanism.

8. The display device according to claim 7, wherein the rear housing of the backlight unit constitutes a shell of the display device.

9. The display device according to claim 8, further comprising a function module, wherein the function module is provided on an outside surface of the rear housing of the backlight unit.

10. The display device according to claim 1, wherein the transparent bonding adhesive is made of a jelly glue.

11. The display device according to claim 1, wherein the frame is made of aluminum, and the support mechanism is made of aluminum.

12. The display device according to claim 1, wherein the transparent cover plate is a reinforced glass cover plate or a transparent plastic cover plate.

\* \* \* \* \*